United States Patent [19]
Breda

[11] Patent Number: 4,589,438
[45] Date of Patent: May 20, 1986

[54] DIVERTER VALVE WITH INTEGRAL ATMOSPHERIC TYPE VACUUM BREAKER

[76] Inventor: Silvano Breda, 81 Apricot Street, Thornhill, Ontario, Canada

[21] Appl. No.: 694,752

[22] Filed: Jan. 24, 1985

Related U.S. Application Data

[63] Continuation of Ser. No. 466,062, Feb. 14, 1983, abandoned.

[51] Int. Cl.$^4$ .............................................. F16K 24/02
[52] U.S. Cl. ...................................... 137/218; 4/443; 137/874; 137/876
[58] Field of Search .............................. 4/420.1–420.5, 4/443–448; 137/217, 218, 625.11, 625.47, 874, 876

[56] References Cited

U.S. PATENT DOCUMENTS

| | | | |
|---|---|---|---|
| 2,014,639 | 9/1935 | Stumm | 137/625.11 X |
| 2,584,436 | 2/1952 | Donaldson | 137/218 |
| 2,590,386 | 3/1952 | Dobrick | 137/218 |
| 2,906,293 | 9/1959 | Fraser et al. | 137/625.47 |
| 2,927,598 | 3/1960 | Thompson | 137/218 |
| 3,180,352 | 4/1965 | Kersten et al. | 137/218 |
| 3,918,477 | 11/1975 | Grams | 137/218 |
| 4,326,671 | 4/1982 | Goguen | 137/218 X |

*Primary Examiner*—Gerald A. Michalsky
*Attorney, Agent, or Firm*—Ivor M. Hughes

[57] ABSTRACT

This invention relates to a diverter valve with integral atmospheric type vacuum breaker.

3 Claims, 10 Drawing Figures

DIVERTER VALVE WITH INTEGRAL ATMOSPHERIC TYPE VACUUM BREAKER

FIELD OF INVENTION

This is a continuation of Application Ser. No. 466,062 field Feb. 14, 1983, now abandoned relating to a diverter valve with integral atmospheric type vacuum breaker.

BACKGROUND OF THE INVENTION

Backflow preventers, each a mechanical device which automatically forestalls the possibility of any unintentional reverse flow in the water distributing system and in one construction comprises a vacuum breaker-a device which, when strategically located in the feed line of the water system, prevents the reverse flow of water by the admission of air, precluding any back siphonage which might occur, (See U.S. Pat. Nos. 2,303,037 and 3,162,210)-are used in commercial and household installations, for example bidets, Roman Tubs, barber shop and hairdressing salon fixtures, laboratory sinks, food processing facilities, chemical manufacturing and processing facilities, metal plating facilities, just to name a few, to prevent the contamination of the potable water supply. However these installations use the water in different manners and either separate backflow preventers would be required for each use to protect the water supply from contamination or a separate backflow preventer would be installed in the line in advance of the components in the system for diverting the water for the different uses. For example, in a bidet, the water is diverted to the rim and the spray. In a bath tub the water is diverted to the spout, showerhead or removeable handheld shower, and so on. While a number of proposals have been made for the diversion of fluids, (See for example, U.S. Pat. No. 4,312,377) not one structure has been provided which also provides backflow prevention, let alone backflow prevention in a compact, easily manufactured, effective unit.

Particularly in the installation of a bidet, a backflow preventer Model V-360-A Vacuum Breaker manufactured by Sloan Valve Company and a separate diverter valve manufactured by various other manufacturers have been installed with each being serviceable from the outside of the installed fixture. In respect of the installation of a Roman Bath, at the present time, because of the method of installation of faucet and handheld shower, there is no vacuum breaker available for use in such installation and the industry has resorted to the use of a mechanical check valve employing a spring action to close the inlet when the flow of water stops, to overcome this problem. This mechanical check valve has not been approved for such use by the responsible Governmental Authority. To modify existing backflow preventers for use in these installations is not only costly but more importantly, virtually impossible to secure when applied to the installation.

It is therefore an object of this invention, to provide a diverter valve with integral atmospheric type vacuum breaker in an integral structure which is entirely reliable and easily serviced.

Further and other objects of the invention will be realized by those skilled in the art from the following summary of the invention and detailed description of preferred embodiments thereof.

SUMMARY OF THE INVENTION

According to one aspect of the invention, a diverter valve with integral atmospheric type vacuum breaker is provided.

According to another aspect of the invention, there is provided a diverter valve with integral atmospheric type vacuum breaker for connection to a faucet or other valve which faucet or other valve controls water flow to the diverter valve, the diverter valve comprising a main housing or body, having an integral central chamber portion (preferably a vertically extending symmetrical chamber portion), defined by an internal wall and, vertically directed openings at opposed ends of the housing or body through the housing or body into the central chamber portion, a plurality of laterally directed openings extending from the outer surface of the body through the internal wall of the body, opening into the chamber, at least one opening for directing water for one type of use and at least one opening for directing water for another type of use, an inlet tube in communication with the lowermost of the vertically directed openings and extending a predetermined distance from the lowermost vertically directed opening to an opening (preferably an open end) said lowermost vertically directed opening for being in communication with the faucet or other valves controlling the water flow to the diverter valve, a rotatable cylindrical tube between the internal wall defining the chamber and the outer surface of the inlet tube for permitting communication between selected of such laterally directed openings and the open end of the inlet tube at a time, the cylindrical tube comprising a plurality of sets of spaced openings spaced by a predetermined distance, one set of at least one opening for alignment with at least one opening for directing water for one use and another set of at least one opening for alignment with the at least one opening directing water for another use whereby when one set of at least one opening is fully aligned with the at least one opening, the other set of at least one opening is not in communication with the other at least one opening and whereby when the cylindrical tube is rotated to align a set of at least one opening with at least one opening for directing water for one or the other type of use, water entering the inlet tube from the lowermost vertically directed opening of the main body or housing continues to flow passing out of at least one of the openings in the body for directing water for one or the other type of use, a float disc assembly reciprocal from a position spaced from the opening in the inlet tube closing the upper end of the diverter valve to the atmosphere, to a position closing the inlet tube opening the upper end of the diverter valve to atmosphere, the float disc assembly comprising a resilient seat having a diameter less than the inner diameter of the rotatable cylindrical tube and at least the outer diameter of the inlet tube and carrying a downwardly depending skirt at the perimeter thereof whereby when fluid is fed through the inlet tube into the valve the assembly is moved away from the opening in the inlet tube closing the valve to atmosphere to permit the fluid to pass out the opening of the inlet tube into the valve, and when fluid is not passed through the inlet tube, the assembly closes the open end of the inlet tube with the skirt surrounding the upper end of the inlet tube and vents the valve to atmosphere, means permitting rotation of the rotatable cylindrical tube and means for mounting the diverter valve with the integral backflow preventer and whereby the structure of said control means ensures that when water passes through the inlet tube, the water is passed through at least one of the outlets.

According to another aspect of the invention, the rotatable cylindrical tube may comprise a tube having an outer surface whose dimensions correspond substantially to the inner surface dimensions of the wall defining the chamber to provide an intimate close tolerance fit therebetween and wherein the tube carries a circumferentially elongated slot having a circumferential length greater than the diameter of one of the at least one opening in the body for directing water for one type of use but less than the sum of (a) the diameter of one of the at least one opening in the body for directing water for one type of use and (b) the diameter of one of the at least one opening in the body for directing water for another type of use, the body carrying a pin therethrough for riding in the elongated slot for causing the cylindrical tube when rotated, to position the one set of openings in the cylindrical tube in line with the at least one opening in the body for directing water for one use when the pin is at one end of the slot and to position the other set of openings in the cylindrical tube in line with the at least other opening in the body for directing water for another use when the pin is at the other end of the slot.

According to another aspect of the invention, the tube is of greater length than the inlet tube and housing or body of the valve.

The invention will now be illustrated with reference to drawings of embodiments of the invention..

DETAILED DESCRIPTION OF EMBODIMENTS OF THE INVENTION

Figure 1:
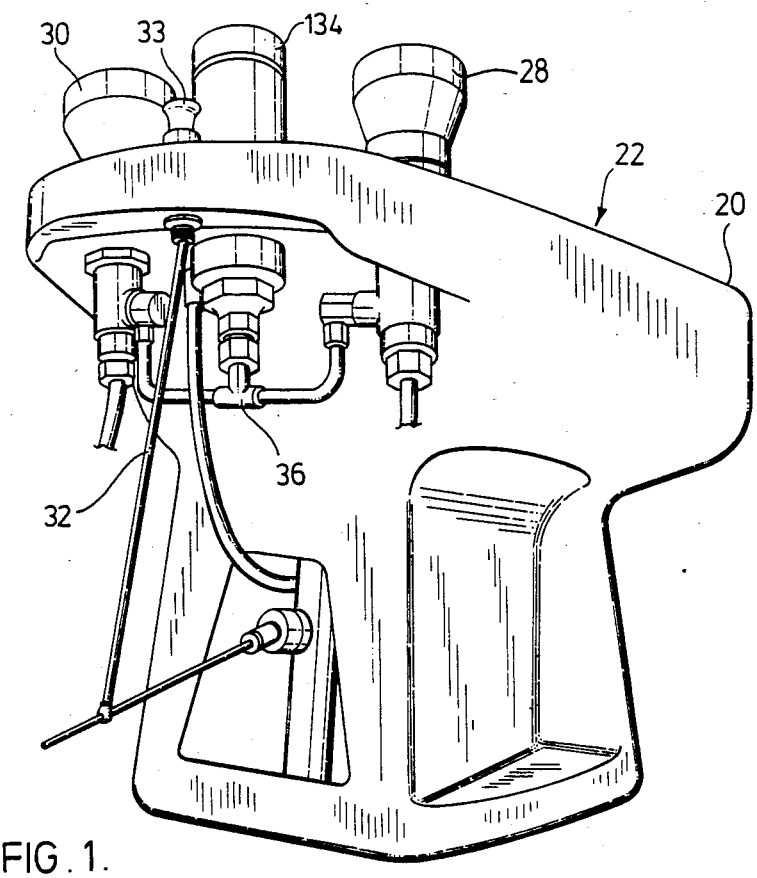
FIG. 1 is a perspective rear view of a bidet mounting a diverter valve with integral atmospheric type vacuum breaker constructed according to one embodiment of the invention.
Figure 2:
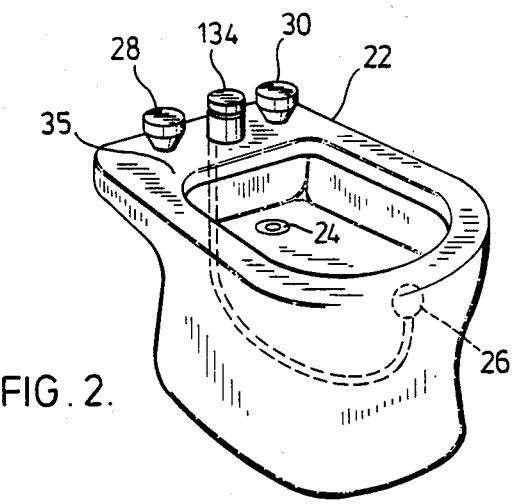
FIG. 2 is a perspective top view of the bidet shown in FIG. 1.

With reference to FIGS. 1 and 2, there is shown bidet 20, comprising porcelain fixture 22, having drain 24, spray 26, faucets for introducing hot and cold water 28 and 30, pop-up drain control 32 for opening and closing drain 24 by handle 33 and diverter valve 134 with integral atmospheric type vacuum breaker secured, to the rim 35 of the bidet 20 and, by T-connection 36 to each of the faucets 28 and 30.

With reference to FIGS. 3, 4, 5, 9 and 10, another diverter valve 34 with integral atmospheric type vacuum breaker is shown in cross-section, mounted on the rim of a Roman Bath 37 and comprises a brass body 38 comprising vertically directed lowermost opening 40, vertically directed upper opening 46, and laterally oppositely directed equal diameter openings 42 and 44 through the sides of body 38, all opening into vertically extending symmetrical chamber portion 48 defined by internal circular wall 56. The exterior of body 38 is threaded at 50. Body 38 also includes radially outwardly extending shoulder rim 52, (providing ledge 52A), screw hole 54 through the threaded portion 50 and circular recess 57 through the radially inner surface of wall 56 to receive "O" ring 60. Proximate the upper extent of opening 40 into chamber 48, body 38 is stepped to provide two ledges 62 and 64, the radially inner edge 62 for supporting axially extending inlet tube 66 spaced from side wall 56 and which inlet tube 66 extends past the upper end of body 38 through opening 46. "O" ring 74 and brass washer 74A are positioned above outwardly flared flange 66A as shown to ensure all fluid passing through opening 40 passes through tube 66.

Annular steel tube 70 having substantially the same outer radial dimensions as the radial dimensions of the inner surface of wall 56 to provide an intimate fit between the outer surface of annular tube 70 and wall 56, sits on Teflon washer 71 in turn sitting on washer 74A in ledge 64 and carries laterally directed equal diameter openings 72 therethrough at the same level and of the same diameter as openings 42 and 44. Circumferentially elongated aperture 54A (seen best in FIG. 9) of a length less than twice the diameter of each of openings 42 and 44 (less than the sum of the diameter of openings 42 and 44 (See FIG. 9)) is provided through tube 70 to align with aperture 54 through body 38 when tube 70 sits on washer 71. Tube 70 is longer than tube 66 and carries at its upper end retainer cap 80 comprising brass casting 82 (see FIG. 9) comprising annular portion 86, U-shaped portion 84 cast with annular portion 86 and upstanding arcuate wall formations 88 and 90 also cast with portion 86, each formation 88 and 90 spaced from U-shaped portion 84 by gaps 92 and 94. Annular portion 86 carries "O" ring 98 proximate its lower end. Threaded blind bore holes 100 are provided from the top of U-shaped portion 84 into U-shaped portion 84 and blind bore hole 101 extends downwardly and opens from the underside of a central portion of U-shaped portion 84 through central air port 103. Travelling pin 102 extends downwardly from bore 101 past annular portion 86 through port 103 and extends into blind bore 104 of float disc assembly 106. Cap 80 of the same radial outer dimensions as the inner dimensions of tube 70, is pushed through end 76 of tube 70 into intimate contact with the inner side wall of tube 70 with "O" ring 98 compressed between brass casting 80 and the interior wall to preclude water passing past the "O" ring at 98.

Float disc assembly 106 carries resilient washer 108 at the upper end thereof, downwardly facing annular washer 110 to seat on the upper end of tube 66 and downwardly depending skirt therefrom. Washers 108 and 110 have a diameter less than the inner diameter of cylindrical tube 70 and greater than the outer diameter of inlet tube 66. The upper end of tube 66 is spaced from the bottom of cap 80 by a distance sufficient to permit washer 110 of float 106 to abut tube 66 closing tube 66 while at the same time spacing resilient washer 108 from the bottom of cap 80 when no fluid passes through opening 40 through tube 66, opening chamber 48 to atmosphere. However when water passes through opening 40 through tube 66, the water forces float 106 upwardly causing washer 108 to abut the bottom of cap 80 sealing compartment 48 from the atmosphere causing all water ejected from tube 66 to pass into the space between tube 70 and tube 66. As is apparent, float 106 at all times travels between the upper end of tube 66 and the bottom of cap 80 controlled on travelling pin 102.

For the purposes of diverting the water passing through tube 66 into the space 48 between tubes 66 and 70, tube 70 carrying laterally directed opening 72, is rotatable to align one of laterally directed openings 72 with a selected one of openings 42 and 44. Because pin 124 rides in slot 54A, the rotation of cylinder 70 is limited by the ends of the slot 54A engaging pin 124 (See FIG. 9), and it is apparent that as one of the openings 72 rotates away from port or opening 42, the other outlet 72 is brought into communication with the other port 44 and water flows through both for a period of time until the other outlet 72 is brought into alignment with the other port 44, and together with elongated aperture 54A permit water to flow through the valve to at least one of the ports or outlets 42 or 44 if water from the faucets 28 and 30 for example continues to be introduced to the diverter valve. The water goes only to the outlet port 42 and 44 through elongated aperture 54A because of "O" rings 57, 59, and 74 (See FIG. 3). To secure tube 70 for rotation, U-shaped pin 112 (See FIG. 9) is pushed through apertures 114 in tube 70 to extend through gaps 92 and 94 between U-shaped portion 84 and arcuate raised shoulder formations 88 and 90 and then through opposed pin holes 116 in tube 70. Handle 120 is in turn secured to U-shaped portion 84 by screws 122 threaded into bore holes 100. Therefore, by rotation of handle 120, tube 70 is rotated bringing one of openings 72 into communication with either opening 42 or 44 directed to, for example, in a Roman Tub the spout of the tub on to the handheld shower leaving the other. Handle Cap 126 seats over handle 120 covering the retaining screws.

To secure tube 70 to body 38 and permit rotation of tube 70 with respect to body 38, screw 216 is secured through aperture 54 in body 38 and circumferentially elongated aperture 54A. An "O" ring 59 is positioned radially inwardly of screws 124. Spacers 128 (like spokes) space tube 66 from tube 70.

For mounting diverter valve 34 to tub rim 37 (See FIG. 3), the upper portion of body 38 is passed through an aperture in the rim with ledge 52A firmly abutting the rim material surrounding the aperture, and holding nut 130 is threaded on threading 50 on the exterior body 38 and seated on the tub rim locking diverter valve into position. Canopy 132 covers threaded body portion 50 hiding nut 130.

Figure 4:
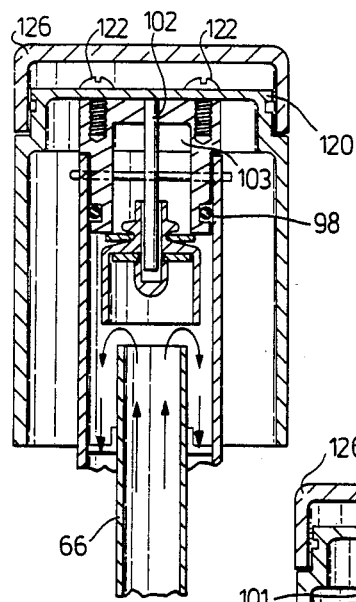
FIGS. 4 and 5 illustrate the operation of part of the valve shown in FIG. 3.
Figure 5:
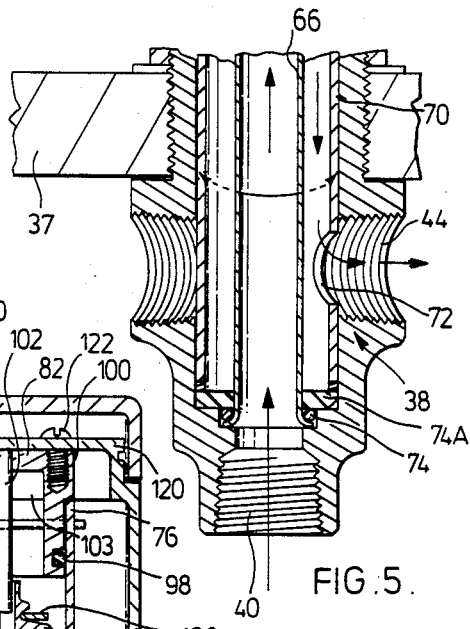
Figure 3:
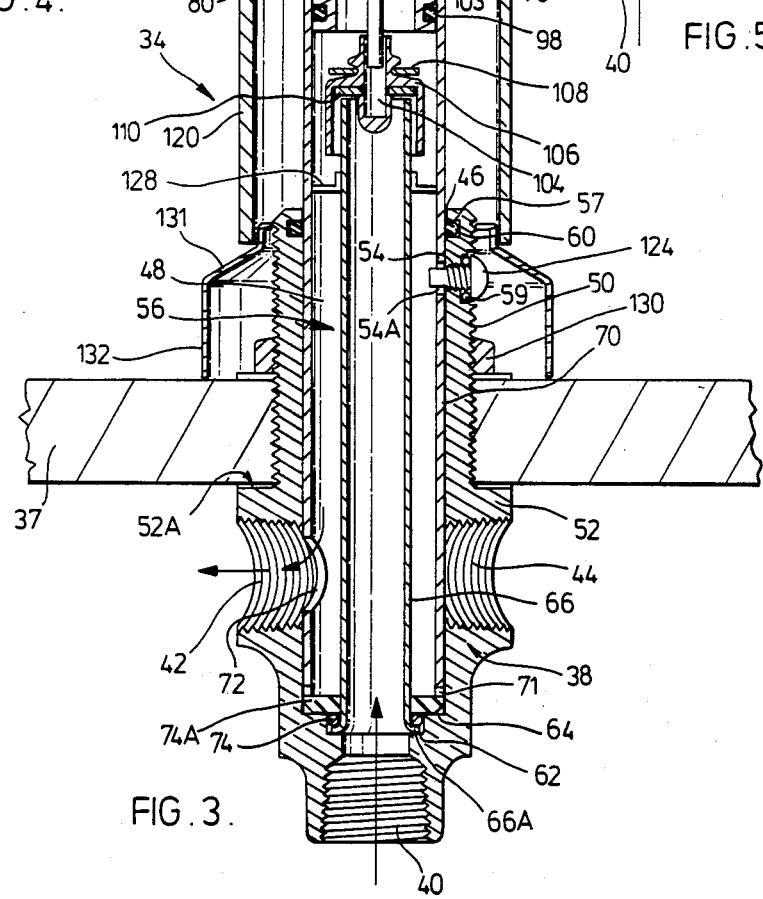
FIG. 3 is a cross-sectional view, taken through a diverter valve with integral atmospheric type vacuum breaker constructed according to another embodiment of the invention.

With reference to FIGS. 4 and 5, when water enters inlet 40 through tube 66, float disc assembly 106 is elevated and the fluid passed through the end of tube 66 falling past spacers 128 to both openings 72 in tube 70 and is diverted through one or the other of openings 42 or 44. When diversion of the fluid to the other opening is desired, tube 70 is rotated by rotating handle 120 until one of openings 72 is aligned with the other opening 44, fully sealing the other opening (See FIG. 5).

While the tolerances between tube 70 and the inner side wall 56 of body 38 provide an intimate fit therebetween because of the precise machining of the parts, nevertheless, water may pass between the two components through for example elongated aperture 54A acting as a lubricant and pass out one of the ports 42 or 44. This water would be precluded from leaking from the valve by the appropriately positioned "O" rings and other seals.

Figure 6:
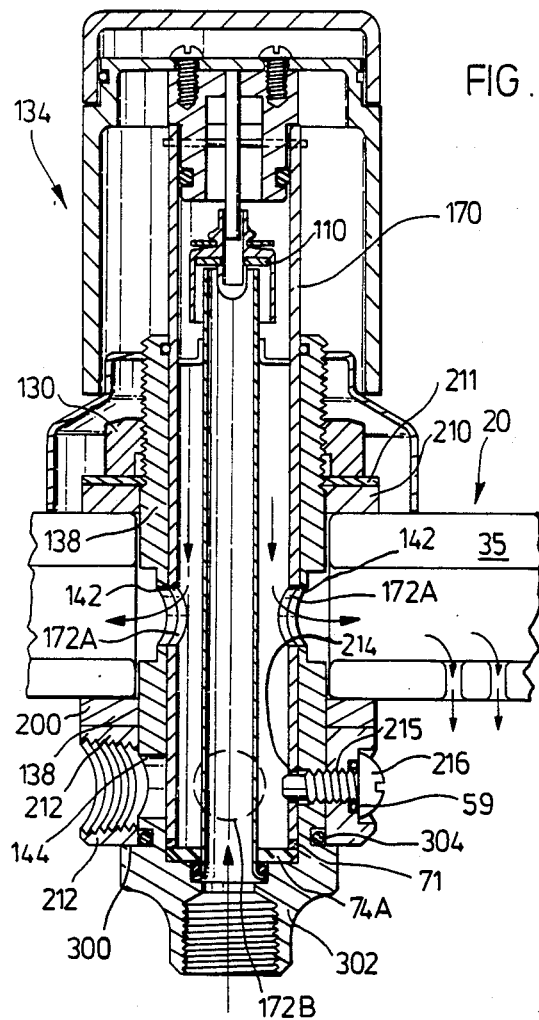
FIG. 6 is a cross-sectional view of the diverter valve with integral atmospheric type vacuum breaker shown in FIGS. 1 and 2.
Figure 7:
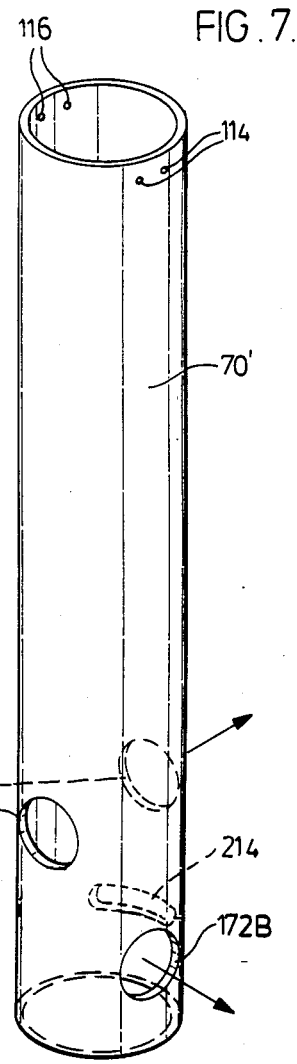
FIG. 7 is a perspective view of a component part of the valve shown in FIG. 6.
Figure 8:
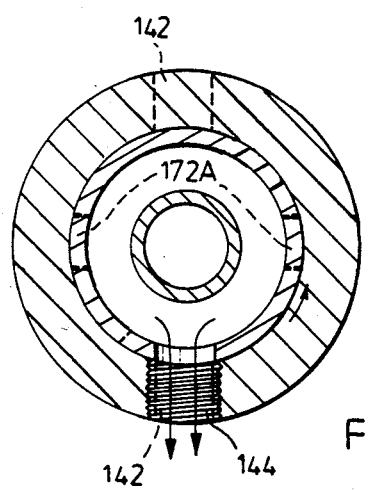
FIG. 8 is a top view of a portion of the valve shown in FIG. 6 illustrating part of its operation.
Figure 9:
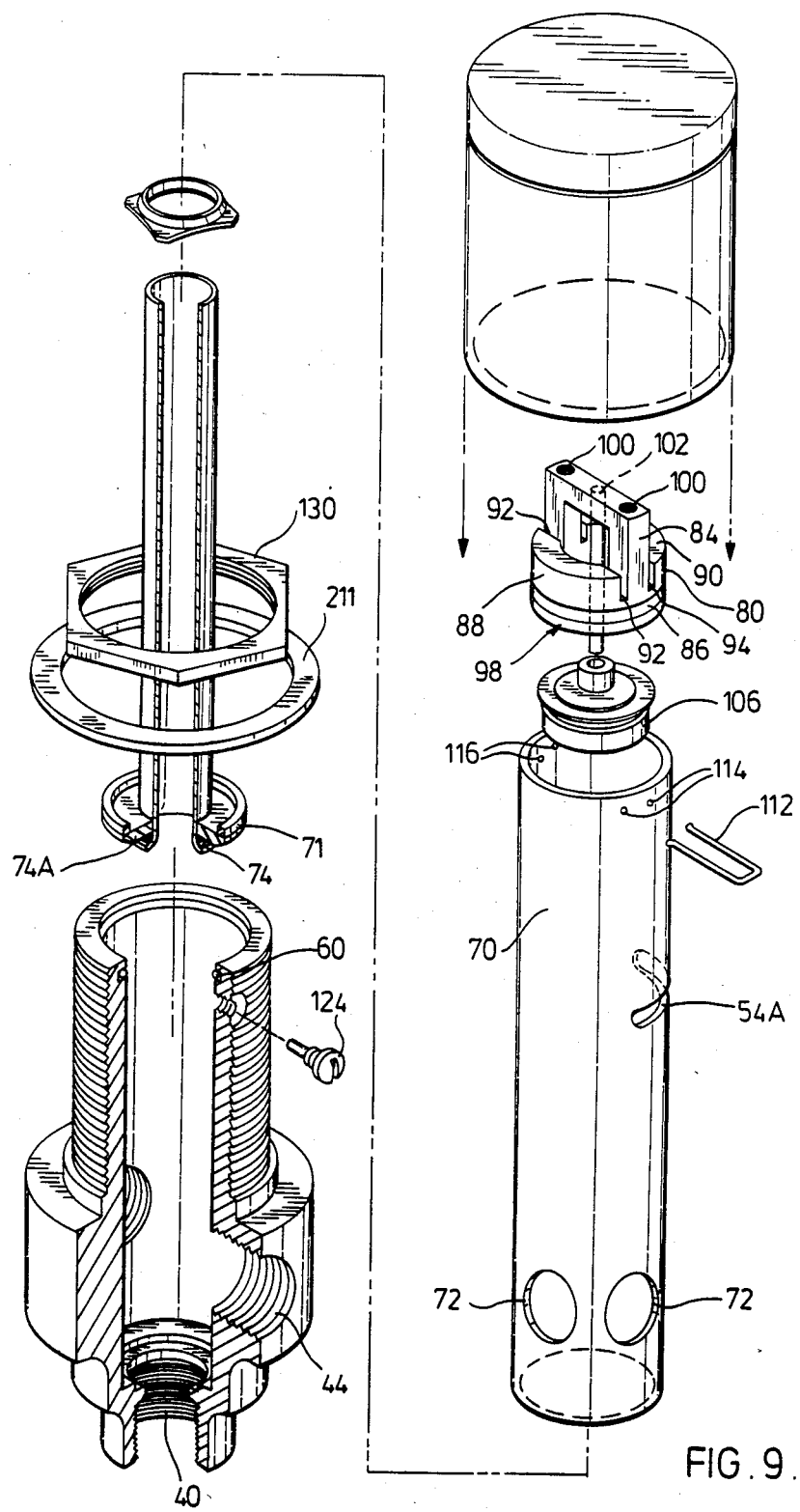
FIG. 9 is an exploded view of component part of the valve shown in FIG. 3.
Figure 10:
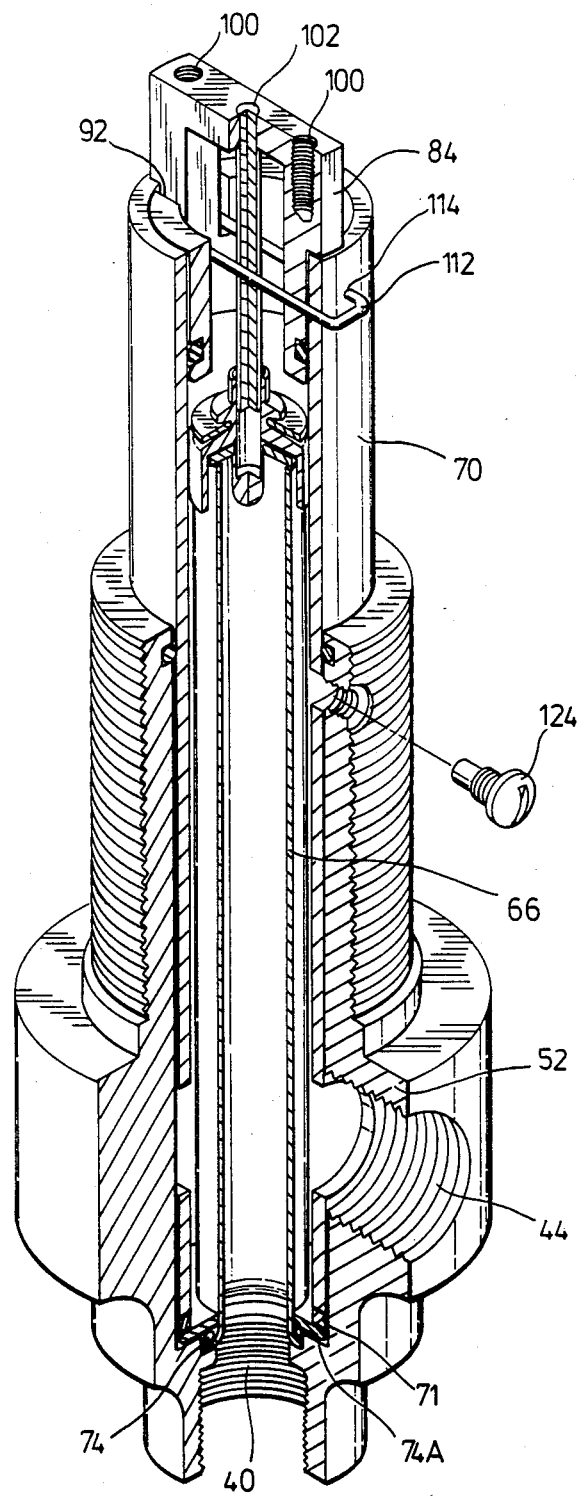
FIG. 10 is an assembled perspective view partly in section of the valve shown in FIG. 9 with a portion of the assembled valve removed.

With reference to FIGS. 6, 7 and 8, diverter valve 134 with integral atmospheric vacuum breaker is constructed similar to valve 34 except that valve 134 is modified for use with bidet 20 shown in FIGS. 1 and 2 and comprises two sets of laterally directed openings 142 and 144 at two different vertically spaced levels in body 138, one set to be selectively aligned with one set of openings at a time of two different laterally directed sets of openings at two different levels 172A and 172B in tube 170 corresponding to the levels of openings 142 and 144. With reference to FIG. 6, openings 142 would direct water to the rim of the bidet for discharge and opening 144 would direct water to spray 26.

Additionally body 138 has been modified to provide detachable annular ring portion 212 (carrying outlet 144 and aperture 215 through which aligning screw 216 is fastened to tube 170 in elongated seat 214 in like manner as aligning screw 124), which sits on ledge 300 of bottom portion 302 of body 138. Washer 200 sits between the underside of the rim 35 of bidet 20 and the top of ring portion 212. Washer 210 and nut 211 sit between the top of rim 35 and nut 130. "O" ring 304 is secured in a recess in portion 212 preclude leakage. Once again other "O" rings are disposed in the valve as required to preclude leakage of water.

As many changes can be made to the embodiments of the invention without departing from the scope of the invention, it is intended that all matter contained herein be interpreted as illustrative of the invention and not in a limiting sense.

The embodiments of the invention in which an exclusive property or privilege is claimed are as follows:

1. A diverter valve with integral atmospheric type vacuum breaker for connection to a faucet or other valve which faucet or other valve controls water flow to the diverter valve, the diverter valve comprising a main housing or body, having an integral central chamber portion defined by an internal wall and, vertically directed openings at opposed ends of the housing or body through the housing or body into the central chamber portion, a plurality of laterally directed openings extending from the outer surfaces of the body through the internal wall of the body opening into the chamber, at least one opening for directing water for one type of use and at least one opening for directing water for another type of use, an inlet tube in communication with the lowermost of the vertically directed openings and extending a predetermined distance from the lowermost vertically directed opening to an open end, said lowermost vertically directed opening in communication with the faucet or the other valve controlling the water flow to the diverter valve, a rotatable cylindrical tube between the internal wall defining the chamber and the outer surface of the inlet tube for permitting communication between selected of such laterally directed openings and the open end of the inlet tube at a time, the cylindrical tube comprising a plurality of sets of spaced openings spaced by a predetermined distance, one set of at least one opening for alignment with at least one opening for directing water for one use and another set of at least one opening for alignment with the at least one opening directing water for another use whereby when one set of at least one opening is fully aligned with the at least one opening, the other set of at least one opening is not in communication with the other at least one opening and whereby when the cylindrical tube is rotated to align a set of at least one opening with at least one opening for directing water for one or the other type of use, water entering the inlet tube from the lowermost vertically directed opening of the main body or housing continues to flow passing out of at least one of the openings in the body for directing water for one or the other type of use, a float disc assembly reciprocal from a position spaced from the open end of the inlet tube closing the upper end of the diverter valve to the atmosphere, to a position closing the inlet tube opening the upper end of the diverter valve to atmosphere, the float disc assembly comprising a resilient seat having a diameter less than the inner diameter of the rotatable cylindrical tube and at least the outer diameter of the inlet tube and carrying a downwardly depending skirt at the perimeter thereof whereby when the fluid is fed through the inlet tube into the valve, the assembly is moved away from the end of the inlet tube closing the valve to atmosphere to permit the fluid to pass out the open end of the inlet tube into the valve, and when fluid is not passed through the inlet tube, the assembly closes the open end of the inlet tube with the skirt surrounding the upper end of the inlet tube and permits venting of the valve to atmosphere, means permitting rotation of the rotatable cylindrical tube a predetermined distance and means for mounting the diverter valve.

2. The diverter valve with integral atmospheric type vacuum breaker of claim 1, wherein the rotatable cylindrical tube comprises a tube having an outer surface whose dimensions correspond substantially to the inner surface dimensions of the wall defining the chamber to provide an intimate close tolerance fit therebetween and wherein the means permitting rotation of the rotatable cylindrical tube a predetermined distance comprises the tube carrying a circumferentially elongated slot having a circumferential length greater than the diameter of one of the at least one opening in the body for directing water for one type of use but less than the sum of (a) the diameter of one of the at least one opening in the body for directing water for one type of use and (b) the diameter of one of the at least one opening in the body for directing water for another type of use, and the body carrying a pin therethrough for riding in the elongated slot for causing the cylindrical tube when rotated to position the one set of openings in the cylindrical tube in line with the at least one opening in the body for directing water for one use when the pin is at one end of the slot and to position the other set of openings in the cylindrical tube in line with the at least other opening in the body for directing water for another use when the pin is at the other end of the slot.

3. The diverter valve with integral vacuum breaker of claim 2 wherein the tube is of greater length than the inlet tube in the housing or body of the valve.

* * * * *